United States Patent
Piguet et al.

[19]

[11] Patent Number: 6,055,893
[45] Date of Patent: May 2, 2000

[54] MACHINING UNIT WITH A ROTATING HEAD

[75] Inventors: Pierre-Louis Piguet, Les Geneveys-sur-Coffrane; Antonio Esposito, Les Genevys-sur-Coffrane, both of Switzerland

[73] Assignee: Esco S.A., Les Geneveys-sur-Coffrane, Switzerland

[21] Appl. No.: 09/066,304

[22] PCT Filed: Sep. 1, 1997

[86] PCT No.: PCT/CH97/00318

§ 371 Date: Apr. 28, 1998

§ 102(e) Date: Apr. 28, 1998

[87] PCT Pub. No.: WO98/09755

PCT Pub. Date: Mar. 12, 1998

[30] Foreign Application Priority Data

Sep. 2, 1996 [FR] France ................................. 96 10930

[51] Int. Cl.[7] ........................................ B23B 5/12
[52] U.S. Cl. .......................... 82/130; 82/131; 82/70.2; 82/98; 82/56
[58] Field of Search ................ 82/130, 131, 1.5, 82/11.5, 56, 70.2, 98; 408/178, 179, 180, 187, 188, 157, 159

[56] References Cited

U.S. PATENT DOCUMENTS

| | | | |
|---|---|---|---|
| 1,797,944 | 3/1931 | Dustan | 82/130 |
| 2,236,944 | 4/1941 | Gerardi | 408/159 X |
| 2,387,290 | 10/1945 | Powell et al. | 408/159 X |
| 3,038,361 | 6/1962 | Holzer | 82/130 X |
| 5,230,266 | 7/1993 | Glomb et al. | 82/130 |

FOREIGN PATENT DOCUMENTS

| | | |
|---|---|---|
| 41 37 923 | 5/1993 | Germany . |
| 91 14527 | 10/1991 | WIPO . |

*Primary Examiner*—Andrea L. Pitts
*Assistant Examiner*—Henry W. H. Tsai
*Attorney, Agent, or Firm*—Davis & Bujold

[57] ABSTRACT

The machining unit is composed mainly of three essential elements which are the rotor, the phase displacement device and the tool drive mechanism. The rotor (100) includes a rotating shaft (1) and is equipped, for example, with four bores, extending parallel to the axis of rotation, into which the cutter carrier axles (9a, 9b, 9c and 9d) are supported. A plunge of the cutters into the material to be machined is controlled by the movement of a command sleeve (19) supporting, at its end, two surfaces (20a and 20b) of ellipsoidal form located to move, in conjunction with the inclined surfaces (14a, 14b, 14c and 14d), the command levers of the tool carrier. The command sleeve can occupy two extreme positions and one intermediary position. A phase displacement device includes a pulley (22) and a reverse pulley (25) mounted rotatably on a shaft (31) to allow angular phase change of the command sleeve (19) with respect to the spindle.

13 Claims, 6 Drawing Sheets

MACHINING UNIT WITH A ROTATING HEAD

FIELD OF THE INVENTION

The present invention concerns a machining unit with a rotating head supporting at least two pairs of pivoting tools for the manufacturing of a non-rotating piece centered along the axis of the rotating head, comprising:

- a framework upon which is mounted a rotor comprising the rotating head and a spindle integral with this head, the rotor being provided with an axial conduit for a guiding cylinder of a wire to be machined, and coupled with means for providing rotational drive,
- means for axial control of the piece, these means being mounted by bearings to the spindle or the rotating head,
- means for maintaining and axially moving the piece,
- at least four tool supports mounted on the rotating head in such a way as to pivot around respective axles extending parallel to the rotation axis, each support comprising a transversely arranged command lever, and
- means for controlling pivoting in conjunction with said command lever and including a rotating command element, that is axially movable in the rotor, and coupled to means for axially moving a command sleeve, and pairs of support members respectively arranged on each command lever and on the corresponding rotating element, each pair of support members including a directing surface and a support surface supporting itself against the directing surface, in a variable position, in relation to the movement of the rotating command element, said directing surface being located on the tool support and the corresponding drive surface being located on the rotating command element, and each directing surface corresponding to a pivoting tool support having the shape of an helical portion whose axis coincides with the pivoting axis of the said support.

DESCRIPTION OF THE RELATED ART

The machining head of this type, described in the international publication WO 91/14527, includes a spindle tool carrier equipped with four tools linked in pairs, each pair being controlled by a numbered axis.

This configuration imposes the use of a relatively advanced control mechanism whose price is high.

This constitutes a major inconvenience and prevents the production of a machine having a relatively low cost of manufacture. In order to alleviate this inconvenience, the present invention proposes to produce a spindle having four coupled tools, but where only one pair of tools can be operate at a time. The selection of the pair of tools, with which machining must be performed, must be able to be selected during rotation of the spindle which carries these tools.

BRIEF SUMMARY OF THE INVENTION

This aim is achieved by the machine unit according to the invention wherein the command sleeve is mounted coaxially on said spindle, in order to slide axially and to occupy a primary position, a secondary position and a middle position, this sleeve having two ellipsoidal drive surfaces at one of its extremities, designed to cooperate with the helical directing surfaces of the drive members and to execute the plunge of the tools, and a phase displacement device designed to cause said command sleeve to rotate a predetermined angle around its axis.

According to a preferred embodiment, the means for axially moving the command sleeve includes a command lever pivoting about an axis mounted on a support fixed to the framework carrying the spindle, this lever comprising two drive nuts centered about axles and engaging respectively two grooves located on opposite sides of a sleeve mounted coaxially on the command sleeve.

The sleeve is preferably mounted on the command sleeve by means of two ball bearings with oblique preloaded contacts.

According to a particularly advantageous embodiment, the phase displacement device includes a pulley linked to the command sleeve by two cotter pins that assure a rotational coupling between said pulley and said sleeve and that allow the latter free to move axially, said pulley being coupled to a rotatable pulley mounted on a tubular support supporting a reverse pulley, mounted freely and linked to a drive pulley mounted on the spindle and driven by a drive motor.

The coupling between the pulley, linked to the command sleeve, and the rotatable pulley can be executed by means of a belt.

The coupling between the reverse pulley and the drive pulley can be executed by means of a belt.

The phase displacement device preferably includes means to change the angular position of the rotatable pulley relative to the reverse pulley.

The means to advantageously change the angular position of the two pulleys includes two contacts integral with the reverse pulley engaged in two helical grooves of a shaft and two contacts integral with the rotatable pulley engaged in two longitudinal grooves of said shaft, as well as a member designed to move said shaft axially.

Said member is preferably a piston and said piston is preferably linked to the shaft by means of a bell cover and a thrust bearing mounted at one end of this shaft.

Said piston is preferably linked to position sensors designed to provide a receipt signal of its movement.

According to a preferred embodiment, the rotatable pulley and the reverse pulley are notched pulleys and have the same number of teeth.

In this case, the helical grooves are designed in such a way that when the piston moves the shaft from a first position towards a second position, the angular displacement of the pulley integral of the command sleeve, with respect to the shaft integral with the spindle, is 90° at the time when the number of pairs of tools carried by the machining head is equal to two.

The piston is preferably joined to an adjusting screw that limits its path.

BRIEF DESCRIPTION OF THE SEVERAL VIEWS OF THE DRAWINGS

The invention will be better understood by referring to one method of production given by way of example in the accompanying drawings in which.

DETAILED DESCRIPTION OF THE INVENTION

With respect to the drawings, the machining unit represented is composed of three essential elements that are the rotor, the phase displacement command device and the drive device of the tools.

Figure 1:
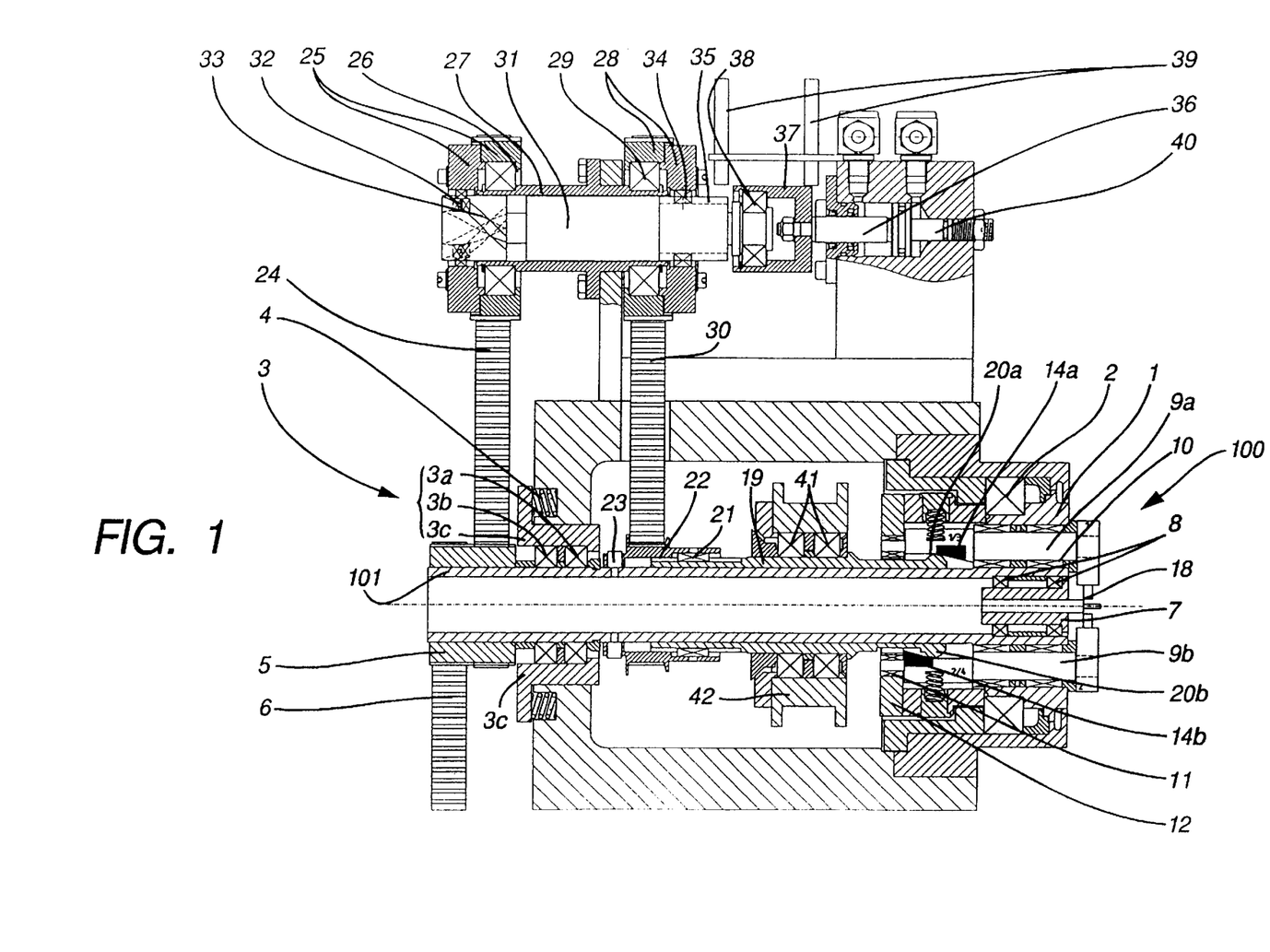
FIG. 1 represents the rotor of the machining unit according to the invention.
Figure 2:
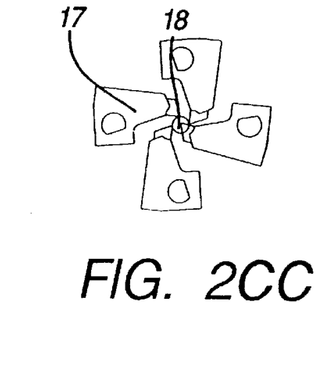
Figure 2A:
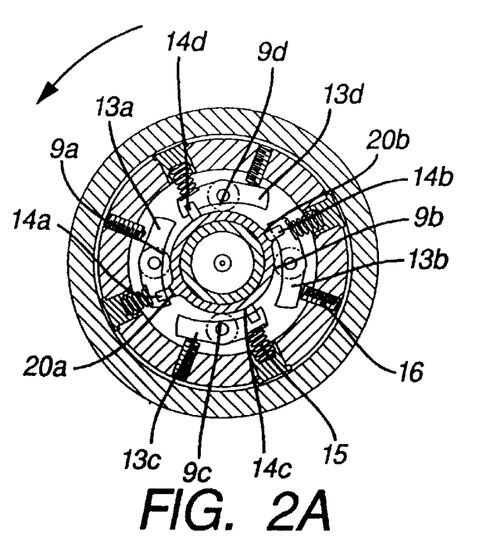
FIGS. 2A and 2AA represent frontal views of the rotating head of the machining unit, according to the invention, in the first position in which one of the cutters plunges into the material to be machined.
Figure 2B:
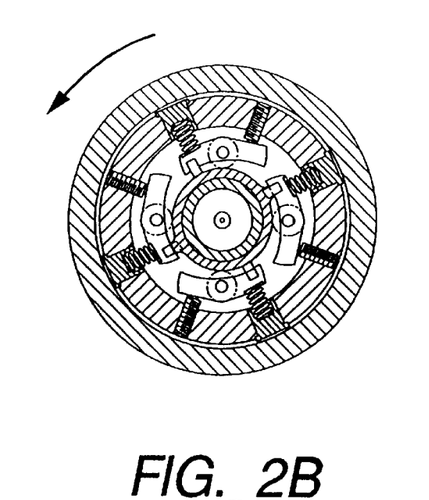
FIGS. 2B and 2BB represent frontal views of the rotating head of the machining unit, according to the invention, in a second position in which the cutters are withdrawn from the material to be machined.
Figure 2C:
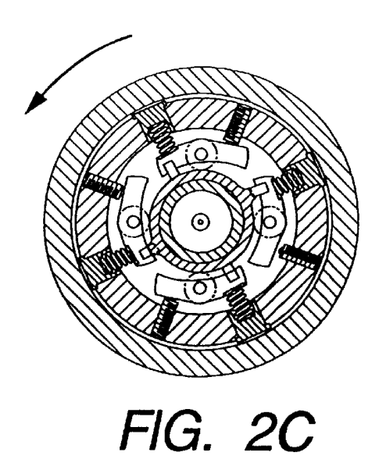
FIGS. 2C and 2CC represent frontal views of the rotating head of the machining unit, according to the invention, in which the cutter opposite to the one that plunges into the material to be machined in FIG. 2AA is in a working position.

The rotor 100, shown in FIG. 1, comprises of a rotating shaft 1 supported by a front bearing 2 and a rear bearing 3 which is composed of two bearings 3a and 3b mounted, at oblique points, in a sliding fit case 3c. The front and rear bearings are mounted in tandem and preloaded by means of a compression spring 4. The rotation of the spindle 101 is achieved by means of a notched pulley 5 coupled to a drive motor (not shown) by a notched belt 6.

The material to be machined, in the form of a wire, is guided by a guiding cylinder 7 located in an axial conduit of the rotor and supported by two preloaded bearings 8. A system of grips (not shown) assures feed of the material.

Shaft 1 contains four borings, extending parallel to but offset from the axis of rotation, in which the cutter carrier axles 9a, 9b, 9c and 9d are mounted. The cutter carrier axles 9a and 9c are identical as well as the cutter carrier axles 9b and 9d. These axles are supported in front by a double needle bearing 10 and in the back by a simple needle bearing 11 housed in a cap 12. Between these bearings are located, interconnected with the cutter carrier axles, command levers 13a, 13b, 13c and 13d (see FIG. 2). One will note that levers 13a and 13c are identical as well as 13b and 13d. Levers 13a and 13c support helical portions 14a and 14c and levers 13b and 13d support helical portions 14b and 14d. The helical portions 14a and 14c are identical as well as helical portions 14b and 14d, but these last two are inverted with respect to the preceding ones. Push springs 15 (see FIG. 2) assure engagement of the work piece while screws 16 allow adjustment of the angular clearance of the command levers and consequently of the corresponding cutter carrier axles.

Cutter carriers 17 are mounted at the front end of the cutter carrier axles 9a, 9b, 9c and 9d. The positioning of the cutters, to a desired diameter from a cutting line 18 of the cutters, is obtained by pivoting the cutter carrier axles 9a to 9d.

This pivoting is accomplished by axial displacement of a command sleeve 19 which carries, at its front end, two ellipsoidal surfaces 20a and 20b designed to be in contact with the helical portions 14a and 14b. When the command sleeve is in the middle position, that is to say an intermediate position with respect to those pictured in FIGS. 3 and 5, the springs 15 bias levers 13a to 13d to pivot, and consequently the corresponding cutter carrier axles 9a to 9d, in such a way that they press against the thrust bearing screw 16. These screws are adjusted so that, in this position of the command sleeve 19, the helical directing surfaces are detached from the ellipsoidal surfaces 20a and 20b.

Figure 3:
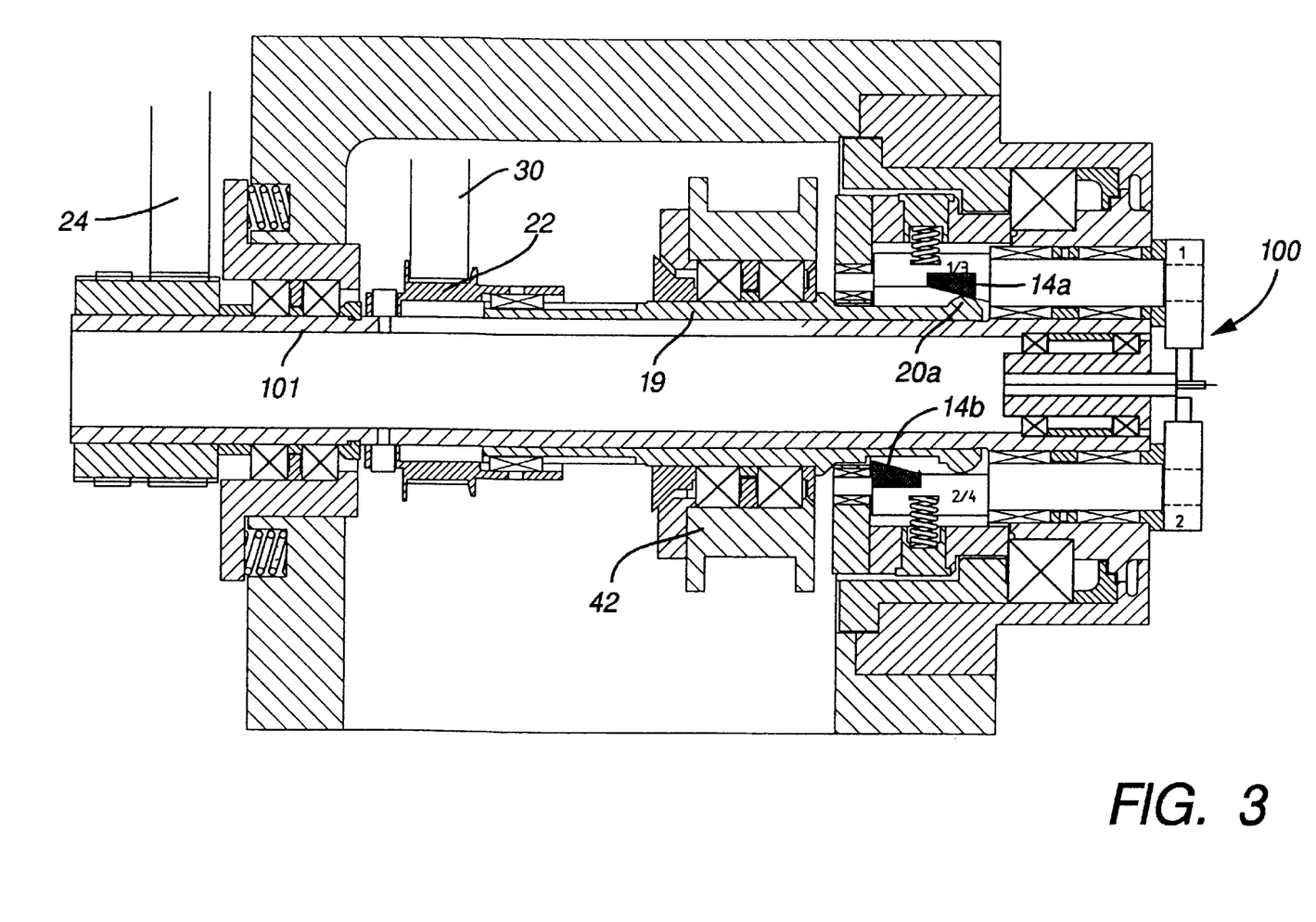
FIG. 3 represents an enlarged view of the rotating head in which the command sleeve is in a primary position, corresponding to the positions of the cutters according to FIGS. 2A, 2AA, 2B, 2BB, 2C and 2CC.
Figure 4:
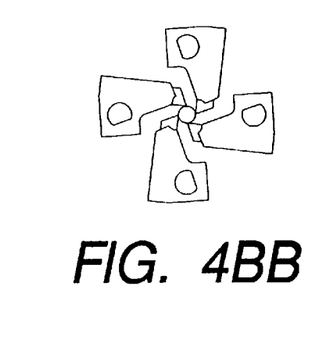
Figures 4, 4C:
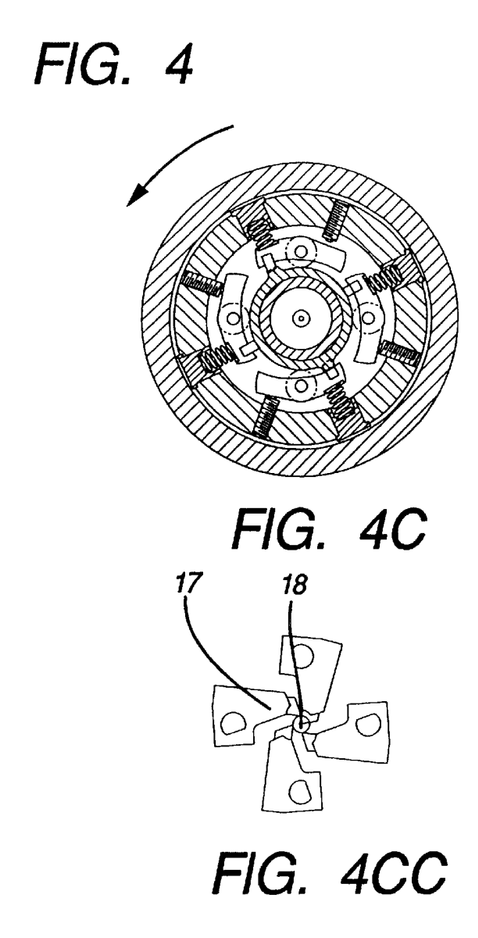
Figure 4A:
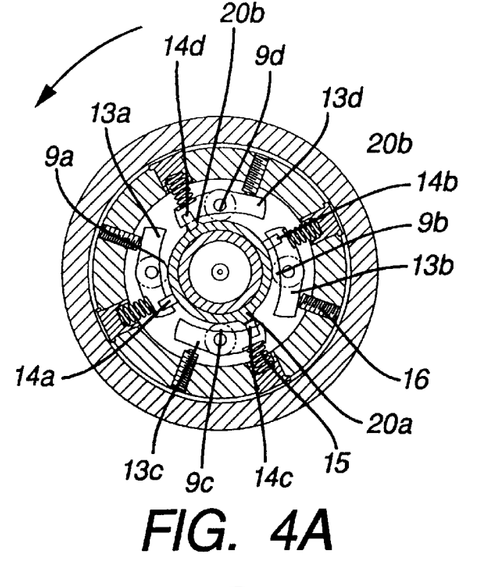
FIGS. 4A, 4AA, 4B, 4BB, 4C, 4CC represent similar views to those of FIGS. 2A, 2AA, 2B, 2BB, 2C, 2CC, respectively, but for a second position of the command sleeve.
Figure 4B:
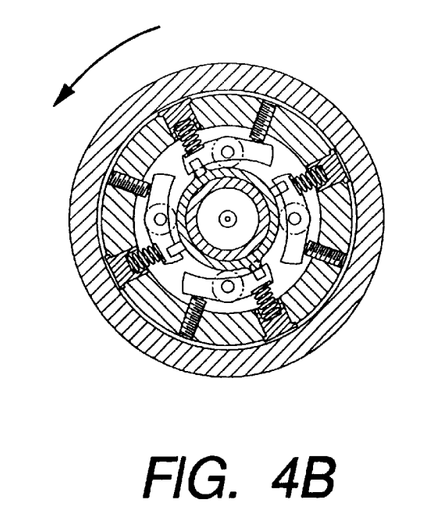

When surface 20a comes into contact with the helical portion 14a, following movement of the command sleeve 19 to the right, as shown in FIG. 3, it causes the pivoting of the command lever 13a and of the cutter carrier axle 9a and consequently a plunging of the cutter into the material to be machined. The cutter carrier lever 13b remains against the screw 16. It is the same for cutter carrier levers 13c and 13d.

Figure 5:
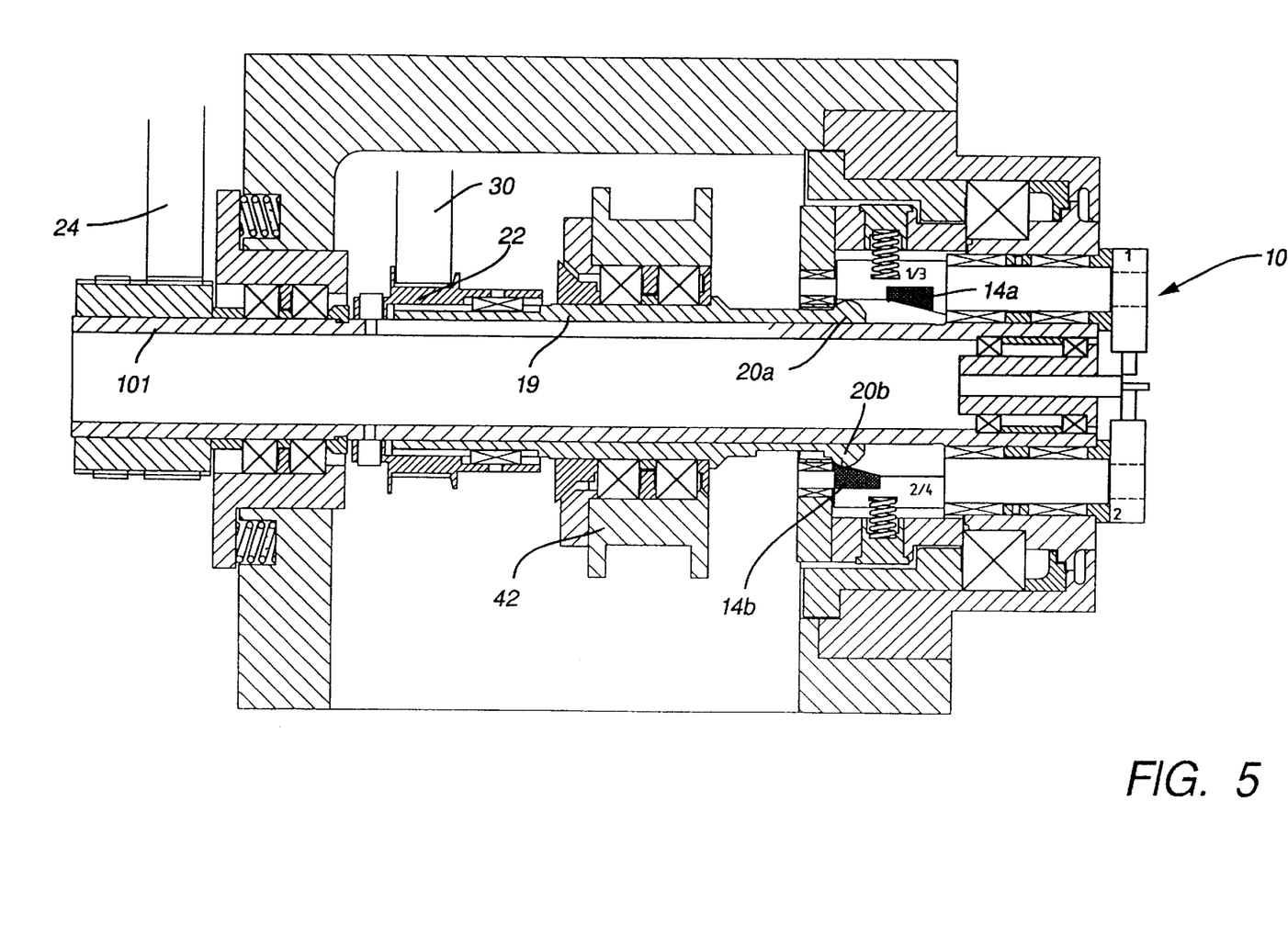
FIG. 5 represents an enlarged view of the rotating head in which the command sleeve is in the second position corresponding to the positions of the cutters according to FIGS. 4A, 4AA, 4B, 4BB, 4C and 4CC.

When surface 20b comes into contact with the helical portion 14b, following movement of the command sleeve 19 to the left, as shown in FIG. 5, it engages the pivoting of lever 13b and of the cutter carrier axle 9b and consequently plunges of the cutter into the material. The cutter carrier lever 13a remains against the screw 16. It is the same for cutter carrier levers 13c and 13d.

In order to work with axles 9c and 9d, one must only rotate the command sleeve 19 a quarter turn with respect to shaft 1. The above discussion also describes the operation of cutter carrier axles 9c and 9d, respectively, instead of cutter carrier axles 9a and 9d.

This rotation of the command sleeve 19 is commenced by a phase displacement device. This device includes a pulley 22 linked to the sleeve 19 via two cotter pins 21 which ensure the rotational coupling but which allow the command sleeve 19 to move freely axially relative to pulley 22. This pulley is equipped with two circular grooves 22A the interiors of which are located thrust bearings 23 interconnected with the shaft 1. The angle of entry is such that it allows pivoting of pulley 22 of a quarter turn relative to shaft 1. The entries also serve to maintain the axial position of pulley 22 by means of thrust bearings 23.

The pulley 5 is coupled to a reverse pulley 25 by way of a belt 24. This reverse pulley is rotatably mounted on a tubular support 27 by means of a bearing 26. On this same support, a second rotatable pulley 28 is mounted by means of a bearing 29. This rotatable pulley 28 is coupled to pulley 22 to drive it by means of a notched belt 30. The reverse pulley 25 is linked to a shaft 31 by two contacts 32, respectively, engaged in two helical grooves 33. The reverse pulley 28 is linked to shaft 31 by two contacts 34 engaged in two longitudinal grooves 35. The shaft 31 can be moved axially by means of a piston 36. This last piece has at its end with respect to shaft 31 a bell cover 37 into which a pressure bearing 38 is mounted. An interior ring of this bearing is fixed to shaft 31. Position sensors 39 limit the path of the piston 36 and provide a receipt signal of its movement.

When the shaft 31 is in the axial-position, shown in FIG. 1, the pulley 22, and consequently the command sleeve 19, turns exactly at the same speed as shaft I because the notched pulleys 5 and 22, respectively pulleys 25 and 28, have the same number of teeth. The angular position of the shaft 1 with respect to that of pulley 22 remains constant.

When the piston 36 is ordered to move to the left (FIG. 1), it pushes the shaft 31 by means of the bell cover 37 and the pressure bearing 38. In this manner, the helical grooves 33 create a relative angular displacement between pulleys 25 and 28 which is transmitted by belts 24 and 30 and causes relative movement of pulley 22 with respect to shaft 1. The specific choice of the pitch of the helical grooves 33; of the path of piston 36, and the relationship between pulleys 5 and 25, 22 and 28, respectively, allows an angle of rotation of 90° to be obtained between the pulley 22 integral with the sleeve 19 and the pulley 5 integral with the shaft 1. This angle can be adjusted by means of an adjusting screw 40 that limits the path of the piston 36.

The choice of one set of tools, or another, can only be made when the command sleeve 19 is in intermediary position, that is to say there is no contact between the inclined portions 14a to 14d and the command surfaces 20a and 20d of ellipsoidal forms.

The number of tools is not limited to two pairs and if space allows one or several pairs of supplementary tools can be mounted on the spindle. The phase displacement command device described above is a means to select a set of tools with which a machine operator wishes to work. This mechanism could be replaced by another device, for example, a gear system whose function would therefore be equivalent to that of the drive pulleys.

Figure 6:
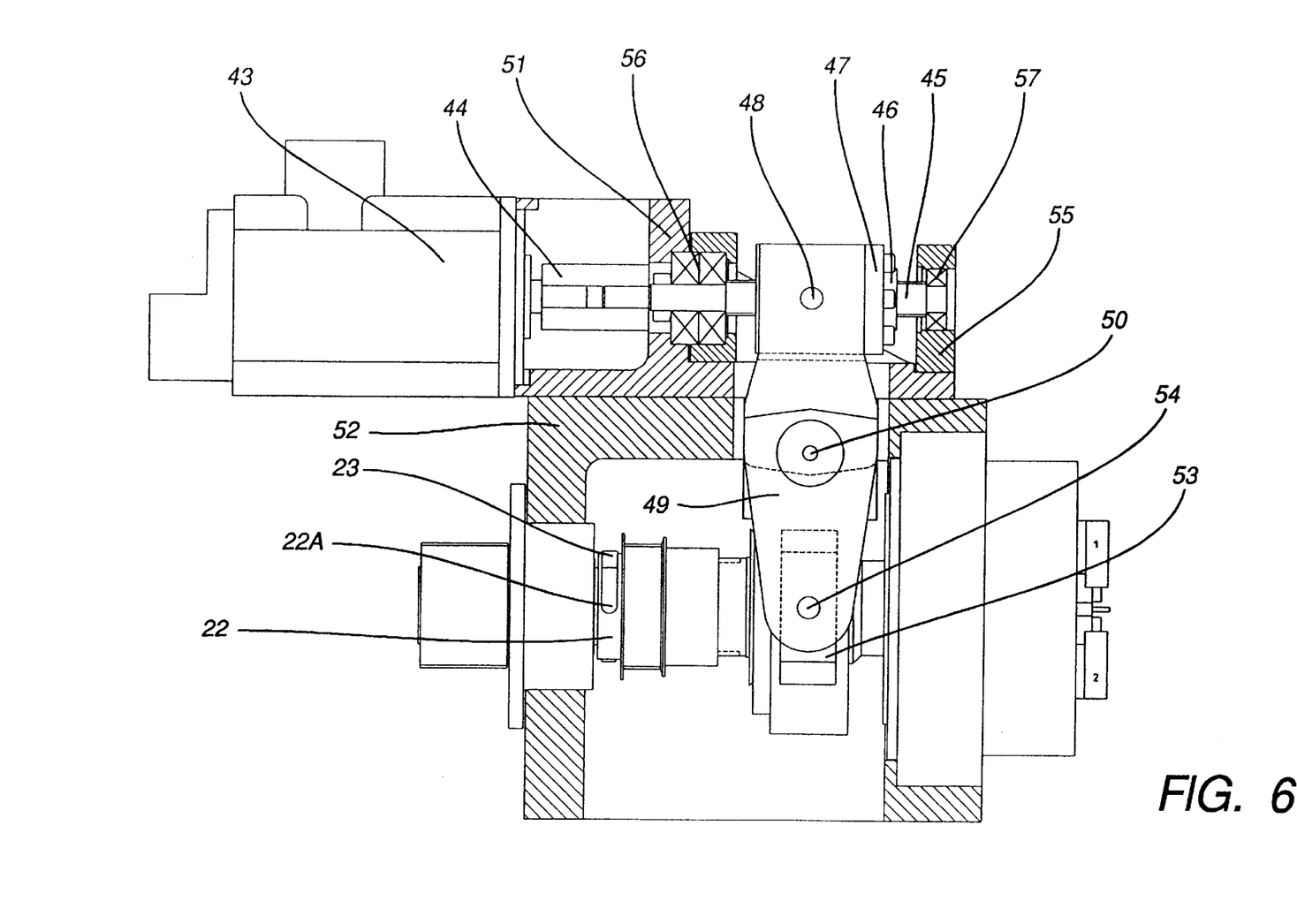
FIG. 6 represents an elevated view showing more specifically the plunge command of the tools.

The drive device of the tools is described in more detail with the references to FIGS. 1 and 6. Its function is to move the command sleeve 19, during the rotation of the spindle, in order to guarantee the plunge of the cutters. To achieve this, a support 51 is mounted above the framework 52 of the spindle, this support having an axle 50 about which a command lever 49 can pivot. This lever includes, near the spindle, two drive nuts 53 centered by axles 54, which are engaged respectively in two grooves located on the opposite sides of a sleeve 42 (see FIG. 1) mounted on the command sleeve 19. While pivoting, the lever 49 axially moves the command sleeve 19, via axles 54, the nuts 53, the sleeve 42 and a pair of ball bearings 41 in an inclined preloaded contact.

The member that generates this movement, is a servomotor 43 with an integrated position sensor, designed to rotate a ball screw 45 by means of a coupling 44. A bearing 56 is designed to take up axial stress while the other end of the ball screw 45 is supported by a bearing 57 housed in a block 55 and fixed on the support 51. The nut 46 of the ball screw 45 is mounted in a block 47 that can pivot relative to an axis 48 supported by the lever 49.

When the motor 43 causes a given rotational movement, this is transformed into a linear movement of the nut 46 and of the block 47 by the threaded system. This block that is linked to the lever 49 by the axis 48, pivots the lever 49, and as a result that the distances between axes 50 and 48 and 50 and 54, respectively, are equal, the command sleeve 19 moves a distance exactly equal to the movement of block 47. A careful assembly can avoid play in the transmission. moves a distance exactly equal to the movement of block 47. A careful assembly can avoid play in the transmission.

I claim:

1. A machining unit with a rotating head with at least two pairs of pivoting tools for machining of a non-rotating piece centered along an axis of rotation, comprising:
    a framework upon which a rotor is mounted including the rotating head and a spindle integral with this head, the rotor being provided with an axial conduit for a guiding cylinder of a wire to be machined, and coupled with means for providing rotational drive;
    means for axial guidance of the piece, this means being mounted by bearings in the spindle or the rotating head;
    means for maintaining and axially moving the piece;
    at least four tool supports mounted on the rotating head in such a way as to pivot around respective axles extending parallel to the rotation axis, each support comprising a transversely arranged command lever, and
    means for controlling pivoting, in conjunction with said command lever and including a rotating command element, that is axially movable in the rotor, and coupled to means for axially moving a command sleeve, and pairs of support members respectively arranged on each command lever and on the corresponding rotating element, each pair of drive mechanisms including a directing surface and a drive surface supporting itself against the directing surface, in a variable position, in relation to the movement of the rotating command element, said directing surface being located on the tool support and the corresponding drive surface being located on the rotating command element, each directing surface corresponding to a pivoting tool support having the shape of an helical portion whose axis coincides with the pivoting axis of said support, and the helical directing surfaces having respective pitches of opposite direction, wherein the command sleeve (19) is mounted coaxially on said spindle (101), in order to slide axially and to occupy a primary position, a secondary position and a middle position, this sleeve having two ellipsoidal drive surfaces (20a and 20b) at one of its ends, designed to co-operate with the helical directing surfaces (14a, 14b, 14c and 14d) of the drive members and to execute the plunge of the tools, and a phase displacement device designed to cause said command sleeve (19) to rotate a predetermined angle around its axis.

2. The unit according to claim 1, wherein the means for axially moving the command sleeve (19) includes a command lever (49) pivoting about an axle (50) mounted on a support (51) fixed to the framework (52) carrying the spindle (101), this lever comprising two drive nuts (53) centered about axles (54) and engaging respectively two grooves located on opposite sides of a sleeve (42) mounted coaxially on the command sleeve (19).

3. The unit according to claim 2, wherein the sleeve (42) is mounted on the command sleeve (19) by two ball bearings (41) with oblique preloaded contacts.

4. The unit according to claim 1, wherein the phase displacement device includes a pulley (22) linked to the command sleeve (19) by two cotter pins (21) that assure a rotational coupling between said pulley and said sleeve and that allow the latter free to move axially, said pulley being coupled to a rotatable pulley (28) mounted on a tubular support (27) supporting a reverse pulley (25) mounted freely and linked to a drive pulley (5) mounted on the spindle and driven by a drive motor.

5. The unit according to claim 4, wherein the coupling between the pulley (22) and the rotatable pulley (28) is executed by means of a belt (30).

6. The unit according to claim 1, wherein the coupling between the reverse pulley (25) and the drive pulley (5) is executed by means of a belt (24).

7. The unit according to claim 4, wherein the phase displacement device includes means to change the angular position of the rotatable pulley (28) relative to the reverse pulley (25).

8. The unit according to claim 7 wherein the means to change the angular position of the two pulleys includes two interdependent contacts (32) integral with the reverse pulley (25), engaged in two helical grooves (33) of a shaft (31) and two interdependent contacts integral with the rotatable pulley (28) engaged in two longitudinal grooves (35) of said shaft (31) as well as a member (36) designed to move said shaft (31) axially.

9. The unit according to claim 8, wherein said member (36) is a piston and that said piston is linked to the shaft (31) by means of a bell cover (37) and a thrust bearing (38) mounted at one end of this shaft.

10. The unit according to claim 9, wherein said piston (36) is linked to position sensors designed to provide a receipt signal of its movement.

11. The unit according to claim 8, wherein the rotatable pulley (28) and the reverse pulley (25) are notched pulleys that have the same number of teeth.

12. The unit according to claim 8, wherein the helical grooves (33) are located in such a way that when the, piston (36) moves the shaft (31) from a first position towards a second position, the angular displacement of the pulley (22) integral with the command sleeve (19) with respect to the shaft (1) integral with the spindle (101), is 90° when the number of pairs of tools carried by the machining head is equal to two.

13. The unit according to claim 12, wherein the piston (36) is joined to an adjusting screw (40) which limits its path.

* * * * *